Figure 1B:
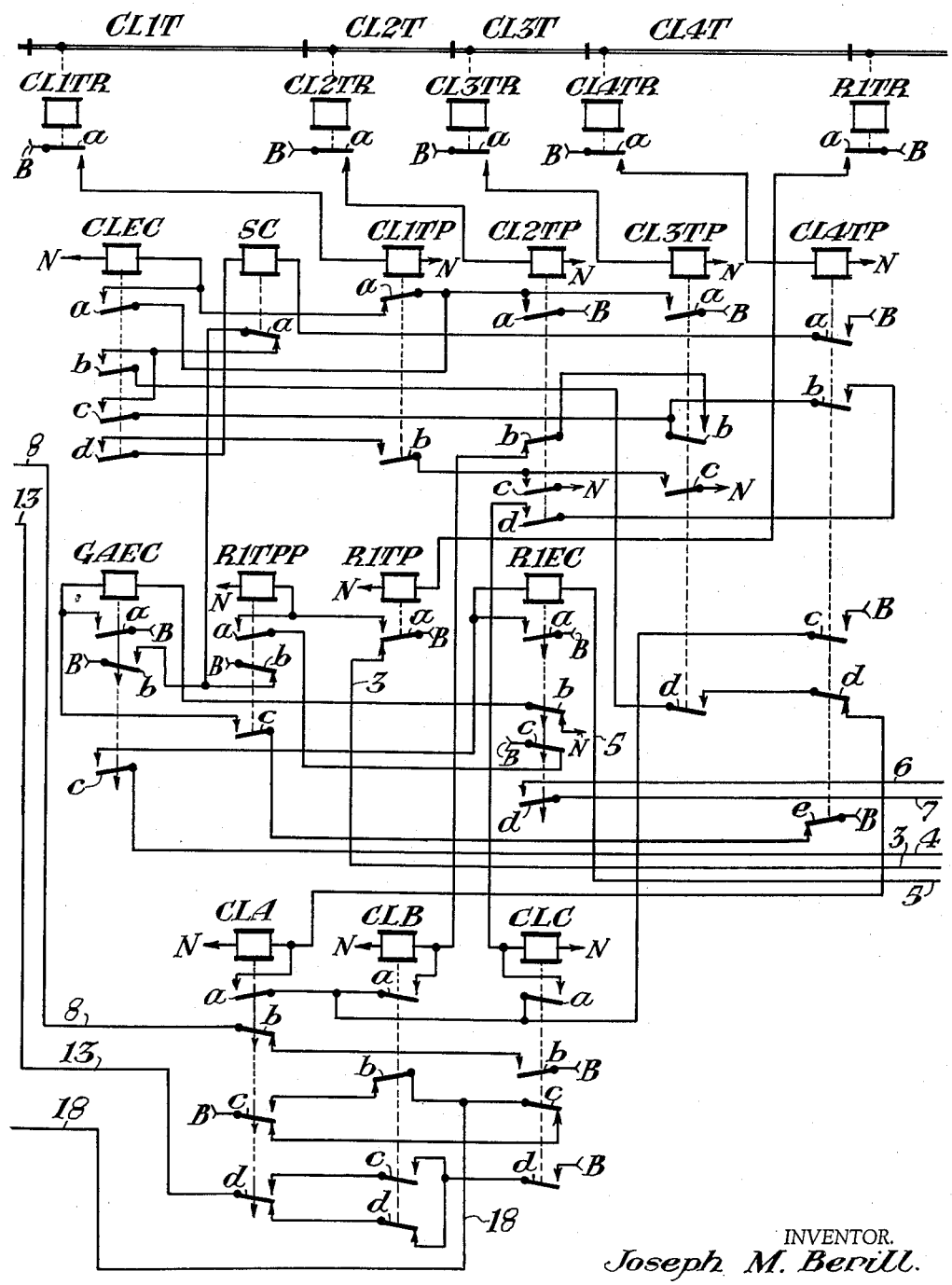

United States Patent Office 2,976,401
Patented Mar. 21, 1961

2,976,401
CUT LENGTH DETECTOR

Joseph M. Berill, Edgewood, Pa., assignor to Westinghouse Air Brake Company, Wilmerding, Pa., a corporation of Pennsylvania Filed Nov. 14, 1957, Ser. No. 696,406

17 Claims. (Cl. 246—1)

My invention relates to measuring apparatus, and, in particular, to a cut length detector for measuring and registering the length of a cut of one or more railway cars.

The copending application of D. P. Fitzsimmons and William A. Robison, Serial No. 676,730, filed August 7, 1957, for Automatic Control System for Railway Classification Yards, which is assigned to the assignee of my present application, discloses an automatic system for classifying railway cars in which each car is routed to a selected destination at a speed controlled to a suitable value. As disclosed in this application, it is desirable to measure the length of cuts of cars in the yard, since if below a predetermined limit, such length is a factor in determining the rolling resistance of the cut, and if over the predetermined limit, a suitable average value of rolling resistance may be employed. Accordingly, it is an object of my invention to provide a cut length detector for use in such a system, or for any other purpose where it is desired to know the length of a vehicle or train of vehicles, which is sufficiently accurate for its intended purpose and yet is relatively simple to install and maintain, is economical, and is of the high degree of reliability required for use in a complex system.

It is a further and more particular object of my invention to provide a cut length detector in which the length of a cut of one or more railway cars is registered as one of a predetermined series of length classifications covering a predetermined range.

It is a further object of my invention to provide means for indicating whether or not a cut of railway cars is below a given length.

Other objects and further advantages of my invention will be apparent to those skilled in the art as the description proceeds.

In practicing my invention, in accordance with one embodiment thereof, I provide a series of adjacent track sections of predetermined length, means for detecting the occupied or unoccupied conditions of each of said sections, and means responsive to the sequence of occupancy and vacancy of said sections for registering the length of a cut of one or more cars traversing said sections in one or more length categories covering a predetermined range.

In the particular embodiment of my invention which is here illustrated and described, the means for registering the length of a cut traversing a series of track sections may comprise three relays, each of which is responsive to a particular sequence of occupancy and vacancy of the track sections, and which by their combined energized conditions indicate the length category in which lies the length of each cut traversing the sections. Further, I provide an additional relay which is energized by the length registration relays when their combined conditions of energization and deenergization do not correspond to any of the predetermined length categories to indicate by its energized condition that the length of the cut traversing the sections is above the predetermined length. I further provide means for energizing a further plurality of relays in combination in dependence on the energized combination of the registration relays when the latter relays are energized in the combination corresponding to one of the predetermined categories.

In the accompanying drawings, corresponding parts are designated by similar reference characters in each of the several views.

I shall first describe one embodiment of my invention, and shall then point out the novel features thereof in the claims.

Figure 1A:
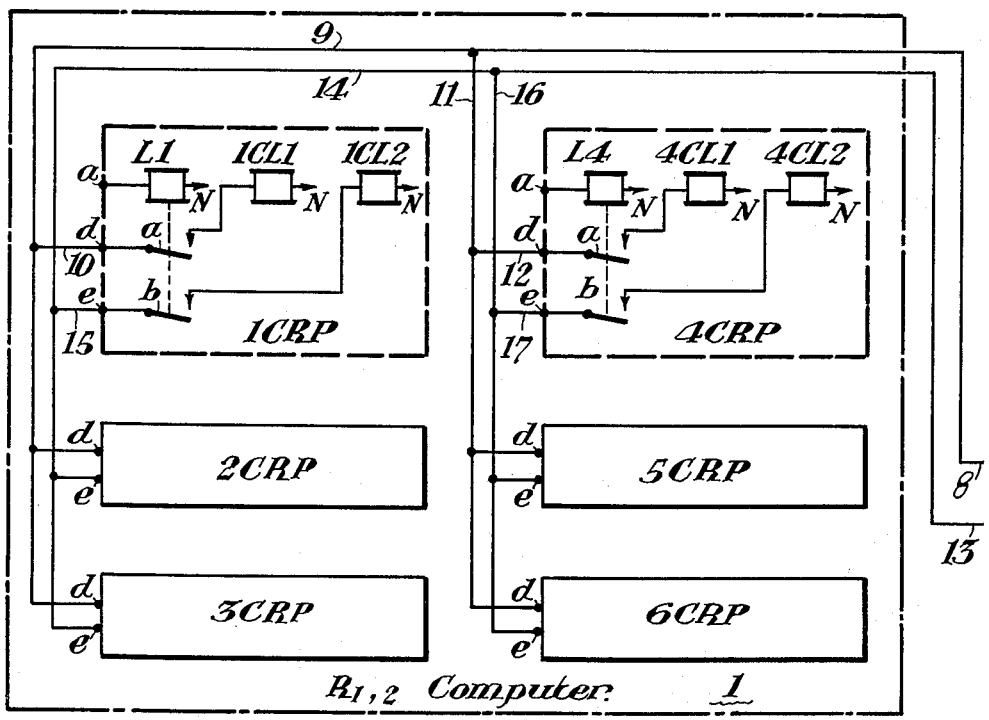
Figure 1A:
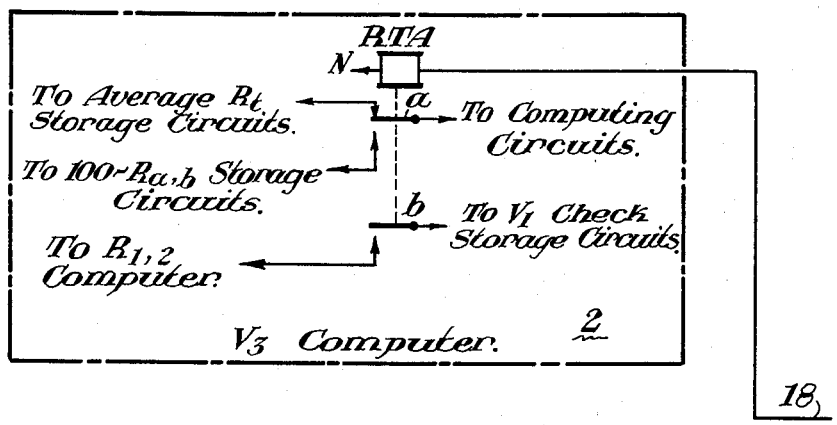
Figure 1C:
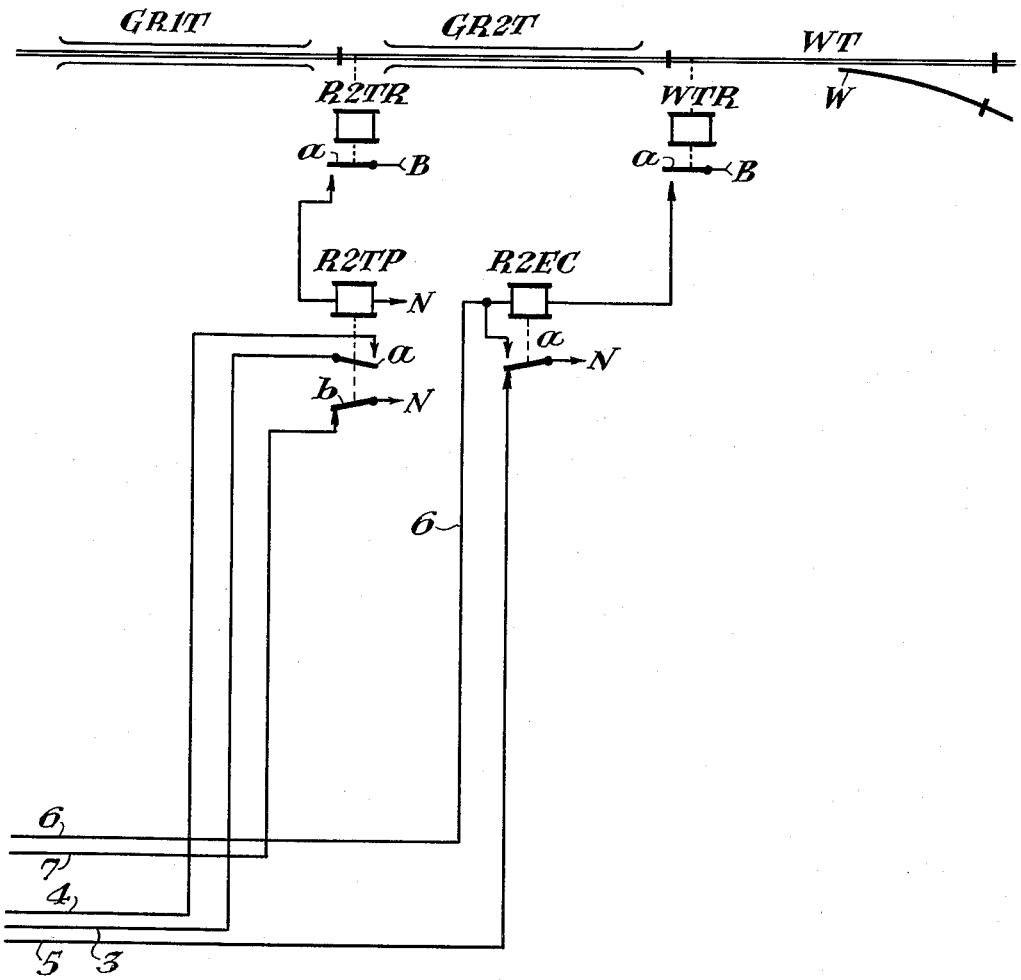

In the drawings, Figs. 1a, 1b and 1c, when vertically oriented and horizontally arranged, comprise a schematic wiring diagram of one embodiment of my invention.

Referring now to the drawings, I have shown a portion of a route in a classification yard of the type shown and described in the above mentioned copending application of Fitzsimmons and Robison, which is assumed to be equipped with an automatic classification system of the class described in the copending application. Since most of the apparatus required for such a system is not necessary to the operation of my invention, only those parts of the system which are necessary to the understanding of my invention are shown, and of the parts shown, most are shown in block form. However, the relationship between these parts and the corresponding part shown in detail in the copending application will be readily apparent to those skilled in the art as the description proceeds. In order to further simplify the drawings, I have not illustrated the conventional D.C. power supply used to operate the apparatus, but have designated the positive and negative terminals of such a source by arrow symbols having associated therewith the symbols B and N, respectively.

In Fig. 1a, I have shown in block form a $R_{1,2}$ computer 1 and a $V_3$ computer 2 which may be constructed in accordance with the corresponding computers 21 and 22 shown schematically in Figs. 12 and 13 of the above-mentioned copending application, and which are shown in more detail in Figs. 18 through 68 of that application.

$R_{1,2}$ computer 1 comprises a series of six computer ratio panels 1CRP through 6CRP as shown, and other apparatus which is shown and described in more detail in the above-mentioned copending application of Fitzsimmons and Robison, as well as in the copending application of Robert W. Mowery, Serial No. 695,337, filed November 8, 1957, and assigned to the assignee of my present application. Each of these panels contains an L relay such as relays L1 and L4, shown in panels 1CRP and 4CRP, and a pair of cut length detecting relays such as 1CL1 and 1CL2, shown in panel 1CRP, and relays 4CL1 and 4CL2, shown in panel 4CRP.

As described in more detail in the above-mentioned copending applications, panels 1CRP and 4CRP are used together, panels 2CRP and 5CRP are used together, and panels 3CRP and 6CRP are used together. One set of panels is selected by the energization of terminals $a$ of the panels from a conventional power supply, not shown, over circuits described in the above-mentioned applications, closing the L relays in the selected set of panels to be energized. For example, if terminals $a$ of panels 1CRP and 4CRP were energized, relays L1 and L4 would be picked up.

The cut length detector relays in each of panels 1CRP through 6CRP are energized over circuits including front contacts of the associated L relay in each panel, to be described.

As fully described in the copending application of Fitzsimmons and Robison, the $V_3$ computer 2 includes a relay RTA which checks whether or not the length of a particular cut under control is below a predetermined length. As schematically indicated, contact $a$ of this relay controls circuits which supply an average value of tangent rolling resistance $R_t$ to the computing circuits when relay RTA is picked up to indicate that the cut length is above the predetermined length, and which supply a measured value of tangent track rolling resistance from storage circuits over the back point of contact $a$ to the computing circuits when the cut length measured is below the predetermined length. Relay RTA is provided with a second contact $b$ in a circuit which is closed only when relay RTA is released and which cooperates with additional apparatus, not shown, to permit the $R_{1,2}$ computer 1 to supply a computed value of $R_{1,2}$ for use in controlling the speed of the cut. These circuits are all fully described and shown in the above-mentioned copending application of Fitzsimmons and Robison, it being sufficient for the purposes of my present application to note that the function of relay RTA is to indicate whether or not the cut length is over a predetermined value, which might, according to one practical embodiment of my invention, be 116 feet.

In Figs. 1b and 1c, I have illustrated a portion of a route in a classification yard of the type shown and described in the above-mentioned application of Fitzsimmons and Robison. This stretch is provided with a series of track sections separated by conventional insulated joints as schematically shown. As shown, the stretch includes in sequence a first measuring track section CL1T, a second measuring track section CL2T, a third measuring track section CL3T, a fourth measuring track section CL4T, a first group retarder track section GR1T, a second group retarder track section GR2T, and a switch detector track section WT which is associated with a track switch W. The illustrated stretch of track may be located in a classification yard in the manner shown in Figs. 1 and 2 in the above noted copending application of Fitzsimmons and Robison.

Each of the above described track sections may be provided with conventional D.C. track circuits, each including a conventional track relay as schematically indicated. Thus, in a manner well known in the art, track relays CL1TR, CL2TR, CL3TR, CL4TR, R1TR, R2TR and WTR are associated with their respective track sections in conventional D.C. track circuits such that each relay is energized when its associated track section is unoccupied and is deenergized when its associated track section is occupied.

In accordance with the illustrated embodiment of my invention, I provide means for dividing the length of each cut of cars into one of five length categories. For example, if I desire to measure cut length in categories of X feet, the corresponding categories would be 0 to X, X to 2X, 2X to 3X, 3X to 4X and over 4X. For this purpose, according to this embodiment of my invention, each of track sections CL1T and CL4T would be 2X feet in length, and each of sections CL2T and CL3T would be X feet in length. In a particular embodiment of my invention illustrated in the copending application of Fitzsimmons and Robison, it is found that average values of rolling resistance may be used for cuts of over 116 feet in length, and that length below this value may be measured with satisfactory accuracy in increments of 29 feet. Accordingly, in a specific embodiment, track sections CL1T and CL4T may each be 58 feet in length, and track sections CL2T and CL3T may each be 29 feet in length. With these dimensions the apparatus of my invention may be used to register the length of a cut in one of the classifications 0 to 29 feet, 29 to 58 feet, 58 to 87 feet, 87 to 116 feet, and over 116 feet.

As noted above, each of track sections CL1T through CL4T is provided with a conventional track relay CL1TR through CL4TR, each controlling a conventional back contact repeater relay CL1TP through CL4TP over obvious circuits, as shown in Fig. 1b, which extend from terminal B of the battery over back contact $a$ of the associated track relay and through the winding of the respective —TP relay to terminal N of the battery. Relays CL1TP through CL4TP are accordingly picked up or released according as sections CL1T through CL4T are occupied or unoccupied.

Track sections GR1T and GR2T of the group retarder are each provided with track relays R1TR and R2TR, respectively. Each of these relays control a back contact repeater relay, R1TP in Fig. 1b and R2TP in Fig. 1c, respectively, over obvious circuits extending from terminal B of the battery over back contact $a$ of the respective track relays, and through the winding of the respective —TP relays to terminal N of the battery.

As shown, an additional repeater relay R1TPP is provided for track section GR1T. Relay R1TPP has a pickup circuit which extends from terminal B of the battery over the front point of contact $a$ of relay R1TP and through the winding of relay R1TPP to terminal N of the battery. Relay R1TPP has a stick circuit which extends from terminal B of the battery over back contact $c$ of relay R1EC, its own front contact $a$ and through the winding of the relay to terminal N of the battery.

Typical switch detector track section WT has a track relay WTR which normally will be associated with other switch control apparatus, not shown, as described in the copending application of Fitzsimmons and Robison. In the illustrated embodiment of my invention this relay is not provided with a back contact repeater, although such a repeater could obviously be provided within the scope of my invention if so desired.

In addition to the track relays and track repeater relays above described, in accordance with this embodiment of my invention, I employ eight additional relays. These are second-cut relay SC, four end-of-cut relays CLEC, GAEC, R1EC and R2EC, and three cut length registration relays CLA, CLB and CLC. The circuits associated with these relays will now be described.

End-of-cut relay CLEC has a pickup circuit which extends from terminal B of the battery over front contact $a$ of relay CL2TP, back contact $a$ of relay CL1TP, and through the winding of the relay to terminal N of the battery. This relay is accordingly picked up when section CL2T is occupied after section CL1T is vacated, indicating that the end of the cut is past the exit end of section CL1T. Relay CLEC has a multiple stick circuit which extends from terminal B of the battery over either front contact $a$ of relay CL2TP or front contact $a$ of relay CL3TP, and thence over a common path including front contact $a$ of relay CLEC and through the winding of the relay to terminal N of the battery. Accordingly, once picked up, relay CLEC will be held up until the cut vacates section CL3T.

Relay GAEC has a pickup circuit which extends from terminal B of the battery over back contact $e$ of relay CL4TP, front contact $c$ of relay R1TPP, through the winding of relay GAEC, and over back contact $b$ of relay R1EC to terminal N of the battery. As will be apparent, this relay will accordingly be picked up after section CL4T has been vacated and while section GR1T is still occupied by the cut, indicating that the cut has cleared the four cut length measurement sections. Relay GAEC has a stick circuit which extends from terminal B of the battery over its own front contact $a$ through the winding of the relay, and over back contact $b$ of relay R1EC, to be described, to terminal N of the battery. As will appear, this circuit is effective to hold up relay GAEC until the cut has completely cleared track section GR1T. As shown in the drawings, relay GAEC may be made somewhat slow to release, for reasons which will appear.

Relay R1EC has a pickup circuit which extends from terminal B of the battery over the back point of contact $a$ of relay R1TP, lead 3, front contact $a$ of relay R2TP, lead 4, front contact $c$ of relay GAEC, through the winding of relay R1EC, and over lead 5 and the back point of contact *a* of relay R2EC to terminal N of the battery. This relay is accordingly picked up when track section GR1T has been vacated and after relay GAEC has come up to indicate that the cut has cleared section CL4T, but while the cut is still occupying track section GR2T. Although relay GAEC is held up over a back contact of relay R1EC, the slow release of relay GAEC will enable the above circuit to be completed before relay GAEC can release. Relay R1EC accordingly is picked up when track section GR1T is vacated and indicates that the cut has passed completely into section GR2T. Relay R1EC has a stick circuit which extends from terminal B of the battery over its own front contact *a*, through its winding, and over lead 5 and the back point of contact *a* of relay R2EC to terminal N of the battery. Relay R1EC is accordingly held up until the end of the cut has cleared section GR2T.

Relay R2EC (Fig. 1c) has a pickup circuit which extends from terminal B of the battery over back contact *a* of track relay WTR, through the winding of relay R2EC, lead 6, front contact *d* of relay R1EC, lead 7, and over back contact *b* of relay R2TP to terminal N of the battery. This relay is accordingly picked up as soon as the cut vacates section R2TP and while it is still occupying track section WT, after relay R1EC has been picked up. The contact of relay R1EC is included in the circuit to ensure that only a cut moving in the normal direction over the route will pick up relay R2EC. Since relay R1EC is held up over back contact of relay R2EC, as previously described, it may be made slightly slow to release to ensure that relay R2EC is picked up as schematically indicated. Relay R2EC has a stick circuit which extends from terminal B of the battery over back contact *a* of track relay WTR, through the winding of the relay, and over the front point of its own contact *a* to terminal N of the battery. Relay R2EC is accordingly held up as long as track section WT is occupied.

Second cut relay SC is included to make the cut length registration for a first cut final as soon as a following cut occupies section CL1T. This relay has a pickup circuit which extends from terminal B of the battery over front contact *a* of relay CL4TP, through the winding of relay SC, over front contact *d* of relay CLEC, front contact *b* of relay CL1TP, and thence over either front contact *c* of relay CL2TP or front contact *c* of relay CL3TP to terminal N of the battery. This relay is accordingly picked up after section CL4T has been occupied by a first cut and relay CLEC has picked up when the first cut is still occupying either track section CL3T or both of sections CL2T and CL3T, and when a second cut comes on to section CL1T. To secure normal operation of the equipment with the dimensions given in this illustrative embodiment of my invention, the cuts must be spaced by 58 feet or more, since closer spacing would permit the following cut to occupy section CL1T before relay CLEC could be energized.

Cut length registration relay CLA has a first pickup circuit which extends from terminal B of the battery over back contact *b* of relay R1TPP, back contact *a* of relay SC, front contact *b* of relay CLEC, front contact *d* of relay CL3TP, back contact *d* of relay CL4TP and through the winding of relay CLA to terminal N of the battery. Since this circuit requires end-of-cut relay CLEC to be picked up, indicating that the cut has cleared section CL1T, and relay CL4TP to be deenergized, indicating that the cut has not yet reached section CL4T, if relay CLA is picked up the cut length must be between 0 and 58 feet. Relay CLA has a second pickup circuit which extends from terminal B of the battery over front contact *b* of relay GAEC, and which is otherwise the same as the previously traced first pickup circuit. This alternate circuit is provided to enable relay CLA to be picked up even though section GR1T may still be occupied by a preceding cut if the end of the first cut has cleared track section CL4T. Relay CLA has a stick circuit which extends from terminal B of the battery over front contact *c* of relay CL4TP, over its own front contact *a*, and through its own winding to terminal N of the battery. Once picked up, this relay is accordingly held up as long as track section CL4T remains occupied.

Relay CLB has a first pickup circuit which extends from terminal B of the battery over back contact *b* of relay R1TPP, back contact *a* of relay SC, front contact *c* of relay CLEC, front contact *b* of relay CL3TP, back contact *b* of relay CL2TP, and through the winding of relay CLB to terminal N of the battery. Since this circuit is completed only after section CL2T has been vacated but before section GR1T has been occupied, the length of the cut must be less than the length of sections CL3T and CL4T; that is, it must be between 0 and 87 feet in length. Relay CLB has a second pickup circuit which is the same as its first pickup circuit except that it includes front contact *b* of relay GAEC shunting front contact *b* of relay R1TPP. This circuit permits the normal operation of relay CLB even though a preceding cut is occupying section GR1T after the preceding cut has cleared section CL4T, as described above in connection with relay CLA. Since relay GAEC is not picked up until section CL4T has been cleared, the second circuit can obviously not interfere with the first traced circuit. Relay CLB has a stick circuit which is similar to that traced for relay CLA, extending from terminal B of the battery over front contact *c* of relay CL4TP, over its own front contact *a*, and through its winding to terminal N of the battery.

Relay CLC has a multiple pickup circuit which extends from terminal B of the battery over either front contact *b* of relay GAEC or back contact *b* of relay R1TP, and thence over a common path including back contact *a* of relay SC, front contact *c* of relay CLEC, front contact *b* of relay CL4TP, front contact *d* of relay CL2TP and through the winding of relay CLC to terminal N of the battery. The choice of either front contact *b* of relay GAEC or back contact *b* of relay R1TPP is provided for the reasons given above in connection with relays CLA and CLB. Since relay CLC will only be picked up with both relays CL2TP and CL4TP picked up before the cut occupies section GR1T, and after it has cleared section CL1T, the cut length must be less than 116 feet. Since section CL3T must be spanned by the cut, the length must be greater than 29 feet. Accordingly, if relay CLC is picked up, the length of the cut must be between 29 and 116 feet.

From the above considerations, if only relays A and B are up, the length of the cut must be between 0 and 58 feet as shown by relay A, between 0 and 87 feet as shown by relay B, and not between 29 and 116 feet as shown by the deenergized condition of relay C. This combination accordingly indicates a cut length of between 0 and 29 feet. If relays A and B are up and relay C is also up, the length of the cut must be greater than 29 feet as shown by relay C and less than 58 feet as shown by relay A. The cut length is accordingly between 29 and 58 feet with all of the relays energized. If only relays CLB and CLC are up, the length of the cut must be not less than 58 feet, as shown by the fact that relay CLA is released, and not greater than 87 feet, as shown by the energized condition of relay CLB. Accordingly, in this condition the cut as between 58 and 87 feet. With only relay CLC up, the length of the cut must be greater than 87 feet, as shown by the released condition of relay CLB, and less than 116 feet, as shown by the energized condition of relay CLC, and accordingly lies in the range of 87 to 116 feet. If the length of the cut is greater than 116 feet, none of the relays will be energized because their pickup circuits will be interrupted at the open back point of contact *b* of relay R1TPP before they can be completed over the contacts of relay CLEC.

As fully described in the above-mentioned copending applications, the length of the cut may be employed as a factor in computing the rolling resistance of a cut on curved track. As schematically shown in Fig. 1a, computer 1 employs for this purpose a set of two cut length repeater relays in each of six computer ratio panels 1CRP through 6CRP. Each set may be energized, as described above, over front contacts a and b of an associated L relay, the L relays being used to select a pair of panels from the six available. Since the circuits in each of the panels are identical, only those for panels 1CRP and 4CRP will be described in detail.

Relays 1CL1 and 4CL1 have pickup circuits which are completed at the same time. These circuits include a common path extending from terminal B of the battery over front contact b of relay CLC, back contact b of relay CLA, lead 8, and thence over a first path including leads 9 and 10, terminal d of panel 1CRP, front contact a of relay L1, and through the winding of relay 1CL1 to terminal N of the battery, and over a second path including leads 11 and 12, terminal d of panel 4CRP, front contact a of relay L4 and through the winding of relay 4CL1 to terminal N of the battery. These circuits are accordingly completed when panels 1CRP and 4CRP have been selected as indicated by the energized condition of their L relays, and when relay CLC is energized and relay CLA is deenergized. From the above description it will be apparent that the CL1 relays are energized when the length of the cut is between 58 and 116 feet. Corresponding circuits, not shown, are provided for the CL1 relays in panels 2CRP, 3CRP, 5CRP and 6CRP.

Relays 1CL2 and 4CL2 have pickup circuits including a common path extending from terminal B of the battery over front contact d of relay CLC, and thence over a first path including front contact c of relay CLB and the front point of contact d of relay CLA to a common lead 13, and over a second path including back contact d of relay CLB and the back point of contact d of relay CLA to common lead 13, and from common lead 13 over a first path including leads 14 and 15, terminal e of panel 1CRP, front contact b of relay L1, and through the winding of relay 1CL2 to terminal N of the battery, and over a second path including leads 16 and 17, terminal e of panel 4CRP, front contact b of relay L4, and through the winding of relay 4CL2 to terminal N of the battery. These relays are accordingly picked up if their associated panels are selected and if either relay CLA, CLB or CLC are all up, indicating a cut length of between 29 and 58 feet, or relays CLA and CLB are released and relay CLC is energized to indicate a cut length of between 87 and 116 feet. The energization of the —CL2 relays accordingly indicates that the cut length is between 29 and 58 feet or between 87 and 116 feet. Corresponding circuits, not shown, are provided for the —CL2 relays in panels 2CRP, 3CRP, 5CRP and 6CRP.

From the above considerations, it will be apparent that if both the CL1 and the CL2 relays are energized, the cut length must be between 87 and 116 feet. If only the CL1 relays are energized, the cut length must be between 58 and 87 feet. If only the CL2 relays are energized, the length of the cut must be between 29 and 58 feet. If neither the CL1 nor the CL2 relays are energized, either the cut length must between 0 and 29 feet or it is not within the measurable range. In the latter case, computer 1 is not utilized, as explained in the above noted copending application. Accordingly, for practical purposes, the deenergized condition of both the CL1 and CL2 relays indicates that the cut length is between 0 and 29 feet.

If either the cut length is not within the measurable range or the equipment is not functioning properly, it is desired to indicate this fact and to supply average rather than computed values to the control equipment described in the copending application of Fitzsimmons and Robison. For this purpose, I provide relay RTA, shown as a component of computer 2 in Fig. 1a. Relay RTA has a multiple pickup circuit which extends from terminal B of the battery over a first path including the front point of contact c of relay CLA and back contact b of relay CLB to common lead 18, and over a second path including the back point of contact c of relay CLA and back contact c of relay CLC to common lead 18, and from common lead 18 through the winding of relay RTA to terminal N of the battery. This circuit may be completed if relay CLA is up and relay CLB is down, which corresponds to a malfunction of the apparatus and not to any of the measurable combinations, or with relays CLA and CLC released, which might occur through a circuit malfunction or would occur normally if the length of the cut under consideration was over 116 feet. It will be apparent that relay RTA will be picked up over one or the other of these circuits for any combination of energization of relays CLA, CLB and CLC except the four above mentioned combinations corresponding to the measurable range, and hence will normally be energized, as shown, when a measured cut length is not being registered.

Having described in detail the structure corresponding to one illustrative embodiment of my invention, I will now describe its operation under typical conditions.

First, let it be assumed that a very short cut of 20 feet in length, which in practice might be an ore car or other special type, enters track section CL1T. Relay CL1TR will be released and relay CL1TP will be picked up over back contact a of relay CL1TR. When the cut occupies section CL2T, relay CL2TR will release and energize relay CL2TP over its back contact a.

Since the cut is less than 29 feet in length, section CL1T will be cleared before CL3T is occupied. When this occurs, relay CL1TR will be picked up and relay CL1TP will accordingly be released. The previously traced pickup circuit for relay CLEC will now be completed over front contact a of relay CL2TP and back contact a of relay CL1TP. Relay CLEC will then complete its previously traced stick circuit including its own front contact a and front contact a of relay CL2TP.

When the cut enters section CL3T, track relay CL3TR it will release and pick up relay CL3TP over its back contact a. The second stick circuit for relay CLEC, including front contact a of relay CL3TP and front contact a of relay CLEC, will now be completed. At the same time, relay CLA will be picked up over its first previously traced pickup circuit including back contact b of relay R1TPP, back contact a of relay SC, front contact b of relay CLEC, front contact d of relay CL3TP and back contact d of relay CL4TP.

When section CL2T is vacated, track relay CL2TR will be energized and relay CL2TP will be released. At this time, relay CLB will be picked up over its previously traced circuit including back contact b of relay R1TPP, back contact a of relay SC, front contact c of relay CLEC, front contact b of relay CL3TP, and back contact b of relay CL2TP.

Since in this case relay CL2TP is released before relay CL4TP is energized, the circuit for relay CLC will remain open.

When section CL4T is occupied, the stick circuits for relays CLA and CLB will be completed over front contact c of relay CL4TP and their own front contacts a. Relays CLA and CLB will accordingly remain up to indicate a cut length of between 0 and 29 feet as long as section CL4T is occupied.

With relays CLA and CLB up, the previously traced circuits for relays 1CL1 and 4CL1 will be interrupted at the open back point of contact b of relay CLA. The previously traced circuits for relays 1CL2 and 4CL2 will be interrupted at the open front point of contact d of relay CLC. Accordingly, both the —CL1 and —CL2 relays will remain down to indicate a cut length of between 0 and 29 feet.

The previously traced circuits for relay RTA include either the front point of contact c of relay CLA and the back point of contact b of relay CLB or the back point of contact c of relay CLA and the back point of contact c of relay CLC. Since neither of these combinations of contacts are closed, relay RTA will be released and the associated computer apparatus will operate on a fully automatic basis as described in the above-mentioned copending applications.

When the cut clears section CL3T, relay CL3TR will pick up and relay CL3TP will release. Both of the stick circuits of relay CLEC will now be released, and this relay will also release. At this time, relays CLA and CLB will be held up over their previously traced stick circuit including front contact c of relay CL4TP and their own front contacts a.

When the cut enters section GR1T, relay R1TR will be released and relay R1TP will be picked up over back contact a of relay R1TR. Relay R1TPP will now pick up over the front point of contact a of relay R1TPP, and will complete its previously traced stick circuit including back contact c of relay R1EC and its own front contact a.

When the cut clears section CL4T, relay CL4TR will be energized and back contact repeater relay CL4TP will be released. Relay GAEC will now pick up over its previously traced circuit including back contact e of relay CL4TP, front contact c of relay R1TPP and back contact b of relay R1EC. Relays CLA and CLB will be released, due to the interruption of their stick circuits at the open front point of contact c of relay CL4TP. Relay RTA will then be reenergized over the back point of contact c of relay CLA and back contact c of relay CLC. The stick circuit for relay GAEC, including its own front contact a and back contact b of relay R1EC will also be completed at this time.

When the cut enters section GR2T, relay R2TR will be released, closing its back contact a and causing relay R2TP to be picked up.

When section GR1T is cleared, relay R1TR will be energized and relay R1TP will be released. The previously traced pickup circuit for relay R1EC, which extends from terminal B of the battery over the back point of contact a of relay R1TP, lead 3, front contact a of relay R2TP, lead 4, front contact c of relay GAEC, the winding of relay R1EC, lead 5, and the back point of contact a of relay R2EC to terminal N of the battery, is now completed, and relay R1EC will pick up, and will stick up over its previously traced stick circuit including its own front contact a and the back point of contact a of relay R2EC. As soon as back contact b of relay R1EC is open, the energizing circuit for relay GAEC will be interrupted, and at the end of its predetermined time delay, this relay will release. With the opening of back contact c of relay R1EC, the previously traced stick circuit for relay R1TPP will be opened and this relay will immediately release.

When the cut enters switch detector track section WT, track relay WTR will be released. However, no further circuit action will take place until section GR2T has been cleared. At this time, track relay R2TR will be energized and repeater relay R2TP will be released. The previous pickup circuit for relay R2EC, including back contact a of relay WTR, the winding of relay R2EC, lead 6, front contact d of relay R1EC, lead 7, and back contact b of relay R2TP will now be completed and relay R2EC will be picked up.

With relay R2EC picked up, the previously traced stick circuit for relay R1EC will be interrupted at the open back point of contact a of relay R2EC, and relay R1EC will be released.

When the cut clears track section WT, track relay WTR will be energized and relay R2EC will be released. The apparatus will now be restored to its initial condition.

Next, let it be assumed that a 50 foot cut enters track section CL1T. Relay CL1TR will be released and relay CL1TP will be picked up. When the cut enters section CL2T, relay CL2TR will be released and relay CL2TP will be picked up. In this case, the cut will enter section CL3T before section CL1T is vacated. At this time, track relay CL3TR and repeater relay CL3TP will be picked up.

The cut will clear CL1T before section CL4T is occupied. When this occurs, track relay CL1TR will again be energized and relay CL1TP will be released. Both of the previously traced pickup circuits for relay CLEC will now be completed, including front contacts a of relays CL2TP and CL3TP in multiple and back contact a of relay CL1TP. With relays CL3TP and CLEC energized, relay CLA can pick up over its previously traced circuit including back contact b of relay R1TPP, back contact a of relay SC, front contact b of relay CLEC, front contact d of relay CL3TP, back contact d of relay CL4TP and the winding of relay CLA.

When the cut enters section CL4T, relay CL4TR will be released and relay CL4TP will be picked up. The previously traced pickup circuit for relay CLA will now be interrupted at the open back point of contact d of relay CL4TP, but at the same time the stick circuit for relay CLA, including front contact c of relay CL4TP and its own front contact a will be completed. As shown, relay CLA may be slightly made slow to release to bridge a brief interruption in its energizing circuit which might otherwise occur at this time.

At the same time, the previously traced pickup circuit for relay CLC, including back contact b of relay R1TPP, back contact a of relay SC, front contact c of relay CLEC, front contact b of relay CL4TP and front contact d of relay CL2TP, will be completed, and relay CLC will pick up, and at the same time complete its previously traced stick circuit including its own front contact a and front contact c of relay CL4TP.

When the cut clears section CL2T, track relay CL2TR will be energized and repeater relay CL2TP will be released. At this time, relay CLB will be picked up over its previously traced circuit including back contact b of relay R1TPP, back contact a of relay SC, front contact c of relay CLEC, front contact b of relay CL3TP, back contact b of relay CL2TP and the winding of relay CLB. At the same time, it will complete its previously traced stick circuit including its own front contact a and front contact c of relay CL4TP.

With relays CLA, CLB and CLC all energized, and assuming for the sake of simplicity that panels 1CRP and 4CRP have been selected and that their associated relays L1 and L4 are energized, the circuit will be completed for energizing relays 1CL2 and 4CL2 over front contact d of relay CLC, front contact c of relay CLB, the front point of contact d of relay CLA, lead 13, thence over a first path including leads 14 and 15 and front contact b of relay L1 to pick up relay 1CL2 and over a second path including leads 16 and 17 and front contact b of relay L4 to pick up relay 4CL2. The previously traced circuits for relays 1CL1 and 4CL1 will, however, be interrupted at the open back point of contact b of relay CLA. Both of the possible energizing circuits for relay RTA will be interrupted, the first at the open back point of contact b of relay CLB, and the second at the open back point of contact c of relay CLC. Relay RTA will accordingly remain released and will permit the computer to operate in a fully automatic fashion.

The cut will clear section CL3T before section GR1T is occupied. When this occurs, track relay CL3TR and repeater relay CL3TP will be released. With relay CL3TP released, the stick circuit for relay CLEC will be interrupted at the open front point of contact a of relay CL3TP and also at the open front point of contact a of relay CL2TP, and relay CLEC will be released.

No further circuit action will take place until the cut enter section GR1T. At this time, relay R1TR will be released and relay R1TP will be picked up. Relay R1TP will be picked up over the front point of contact a of relay R1TPP, and will complete its stick circuit including its own front contact a and back contact c of relay R1EC.

The cut will clear section CL4T before section GR2T is occupied. When this occurs, relay CL4TR will be energized and relay CL4TP will be released. When this occurs, the previously traced stick circuits for relays CLA, CLB and CLC will be interrupted at the open front point of contact c of relay CL4TP and these relays will release. Relay RTA will now be reenergized over its previously traced circuit including front contact c of relay CLA and the back point of contact c of relay CLC. The average value of rolling resistance will now be supplied to the computing circuits over front contact a of relay RTA as a step in the test compute cycle as described in the above-mentioned copending application of Fitzsimmons and Robison. At the same time, the previously traced circuits for relays 1CL2 and 4CL2 will be open at front contact d of relay CLC and these relays will release. In addition, a circuit will now be completed from terminal B of the battery over back contact e of relay CL4TP, front contact c of relay R1TPP, through the winding of relay GAEC, and over back contact b of relay R1EC to terminal N of the battery. Relay GAEC will now pick up and complete its stick circuit including its own front contact a and the back contact b of relay R1EC.

When the cut enters section GR2T, relay R2TR will be released and relay R2TP will be picked up. No further circuit action will take place at this time. The cut will clear section GR2T before section GR1T is occupied. When this occurs, relay R1TR will be picked up and relay R1TP will be released as previously described. With relay R1TP released, relay R1EC will be picked up over its previously traced circuit including the back point of contact a of relay R2EC, front contact c of relay GAEC, front contact a of relay R2TP, and the back point of contact a of relay R1TP, and will complete its previously traced stick circuit including its own front contact a and the back point of contact a of relay R2EC. The remainder of the operation, which will restore the apparatus to its initial condition, is the same as that described above for the case of the 20 foot cut and will not be repeated.

Next, let it be assumed that a cut of 75 feet in length enters track section CL1T, causing relay CL1TR to release and relay CL1TP to pick up. This cut will enter section CL4T before section CL1T is cleared. At the time that this occurs, relays CL2TR and CL3TR will be released and relay CL2TP and relay CL3TP will be energized. Relay CL4TR will be released and relay CL4TP will be picked up. When the cut clears section CL1T, relay CL1TR will be picked up and relay CL1T will be released, and relay CLEC will be picked up over both of its previously traced pickup circuits, which include front contacts a of relays CL2TP and CL3TP in multiple and back contact a of relay CL1TP. The pickup circuit for relay CLA will be interrupted at this time at the open back point of contact d of relay CL4TP. The pickup circuit for relay CLB will be interrupted at the open back point of contact b of relay CL2TP. However, the previously traced pickup circuit for relay CLC, including back contact b of relay R1TPP, back contact a of relay SC, front contact c of relay CLEC, front contact b of relay CL4TP, and back contact d of relay CL2TP, will be completed, and relay CLC will pick up and will complete its stick circuit over front contact c of relay CL4TP and its own front contact a. With relay CLC energized, the energizing circuit for relay RTA will be interrupted at the open back point of contact c of relay CLC. The alternate energizing circuit for relay RTA will be interrupted at the open front point of contact c of relay CLA and relay RTA will accordingly release.

The cut will clear section CL2T before section GR1T is occupied. When this occurs, relay CLB will be picked up over its previously traced circuit including back contact b of relay R1TPP, back contact a of relay SC, front contact c of relay CLEC, front contact b of relay CL3TP, and back contact b of relay CL2TP, and will complete its stick circuit over its own front contact a and front contact c of relay CL4TP.

With relays CLB and CLC energized, a circuit will now be completed from terminal B of the battery over front contact c of relay CLC and back contact b of relay CLA to lead 8, and thence over leads 9 and 10 and front contact a of relay L1 and through the winding of relay 1CL1 to terminal N of the battery, and from lead 8 over leads 11 and 12 and front contact a of relay L4 and through the winding of relay 4CL1 to terminal N of the battery. However, the pickup circuits for relays 1CL2 and 4CL2 will be interrupted at the open front point of contact d of relay CLA, the alternate circuit being open at the open back point of contact d of relay CLC. The apparatus will thus register a cut length of between 58 and 87 feet.

The cut will enter section GR1T before section CL3T is cleared. When this occurs, relay R1TR will be released and relay R1TP will be picked up as previously described. No further circuit action will take place at this time.

When section CL3T is vacated, relay CL3TR will be picked up and relay CL3TP will be released, causing relay CLEC to be released as previously described.

Section GR2T will be occupied before section CL4T is cleared. When this occurs, track relay R2TR will be released and relay R2TP will be picked up. No further action will take place until section CL4T is cleared. When this occurs, track relay CL4TR will be picked up and relay CL4TP will be released.

With relay CL4TP released, relays CLB and CLC will be released due to the interruption of their previously traced stick circuits at the open front point of contact c of relay CL4TP. With relays CLB and CLC released, relay RTA will be energized over its previously traced circuit including the back point of contact c of relay CLA and back contact c of relay CLC. At the same time, the previously traced energizing circuit for relays 1CL1 and 4CL1 will be interrupted at the open front point of contact b of relay CLC and these relays will accordingly release. The cut having cleared section CL4T, relay GAEC will be picked up over back contact e of relay CL4TP, front contact c of relay R1TPP, the winding of relay GAEC and back contact b of relay R1EC. Relay GAEC will remain up over its front contact a and back contact b of relay R1EC.

The cut will occupy track section WT before section GR1T is cleared. When this occurs, relay WTR will be released, but no further circuit action will take place at this time.

When the cut clears section GR1T, relay R1TR will be energized and relay R1TP will be released. Relay R1EC will now be picked up over the back point of contact a of relay R1TP, lead 3, front contact a of relay R2TP, lead 4, front contact c of relay GAEC, the winding of relay R1EC, lead 5, and the back point of contact a of relay R2EC. Relay R1EC will complete a stick circuit including its front contact a and the back point of contact a of relay R2EC. After its predetermined time delay circuit relay GAEC will release, since its stick circuit is now open at the open back point of contact b of relay R1EC. Relay R1TPP will also be released, since its stick circuit is interrupted at the open back point of contact c of relay R1EC. When the cut clears section GR2T, track relay R2TR will be energized and relay R2TP will be released. Relay R2EC will now be energized over back contact a of relay WTR, front contact d of relay R1EC and the back point of contact d of relay R2TP. The previously traced stick circuit for relay R1EC is now interrupted at the open back point of contact a of relay R2EC, and at the end of its predetermined time delay period, relay R1EC will release.

When the cut clears section WT, relay WTR will be energized and will cause relay R2EC to release, thus restoring the apparatus to its initial condition.

Next, let it be assumed that a cut of 100 feet in length enters track section CL1T, causing relay CL1TR to be released and relay CL1TP to be picked up. As in the previous case, this cut will occupy section CL4T before section CL1T is cleared. When this occurs, relays CL1TR, CL2TR, CL3TR and CL4TR will all be released, and relays CL1TP, CL2TP, CL3TP and CL4TP will be energized. When track section CL1T is cleared, causing track relay CL1TR to be picked up and relay CL1TP to be released, relay CLEC will be picked up as previously described. The circuit for relay CLA will be interrupted at the open back point of contact $d$ of relay CL4TP. The pickup circuit for relay CLB will be interrupted at the open back point of contact $b$ of relay CL2TP. However, the pickup circuit for relay CLC, including back contact $b$ of relay R1TPP, back contact $a$ of relay SC, front contact $c$ of relay CLEC, front contact $b$ of relay CL4TP, front contact $d$ of relay CL2TP will be completed, and relay CLC will pick up and complete its stick circuit over front contact $c$ of relay CL4TP.

With relay CLC energized, the energizing circuit for relay RTA is open at the open back point of contact $c$ of relay CLC, and relay RTA will release to permit the computer to operate in the fully automatic manner. At the same time, the circuits for relays 1CL1 and 4CL1 are completed over front contact $b$ of relay CLC and back contact $b$ of relay CLA and to lead 8, and thence over the first previously traced path including front contact $a$ of relay L1 to pick up relay 1CL1, and over the second previously traced path including front contact $a$ of relay L4 to pick up relay 4CL1. In addition, relays 1CL2 and 4CL2 are energized over a circuit including front contact $d$ of relay CLC, back contact $d$ of relay CLB, the back point of contact $d$ of relay CLA, lead 13, and front contacts $b$ of relays L1 and L4, respectively, as previously described.

With the —CL1 and —CL2 relays energized, the computer may proceed on the basis of a cut length of between 87 and 116 feet.

Track section GR1T will be occupied before section CL2T is cleared. When this occurs, track relay R1TR will be released and relay R1TP will be picked up, causing relay R1TPP to be picked up and to complete its stick circuit as previously described. Accordingly, when section CL2T is cleared, causing relay CL2TR to be picked up and relay CL2TP to be released, relay CLB cannot be picked up because its circuit is interrupted at the open back point of contact $b$ of relay R1TPP. The circuit for relay CLA is still interrupted at the open back point of contact $d$ of relay CL4TP.

Section CL3T will be cleared before section CL2T is occupied. When this occurs, relay CL3TR will pick up and relay CL3TP will be released. Relay CLEC will now be released as previously described.

Section GR2T will be occupied before section CL4T is cleared. When this occurs relay R2TR will be released and relay R2TP will be picked up.

When section CL4T is cleared, relay CL4TR will be picked up and relay CL4TP will be released. Relay GAEC will now be picked up as previously described. At the same time, relay CLC will be released, due to the opening of its stick circuit at the open front point of contact $c$ of relay CL4TP. With all of relays CLA, CLB and CLC released, relays 1CL1, 1CL2, 4CL1 and 4CL2 will be released. At the same time, an energizing circuit for relay RTA will again be completed over the back point of contact $c$ of relay CLA and back contact $c$ of relay CLC, and relay RTA will again be energized.

Detector track section WT will be occupied before section GR1T is vacated. When this occurs, track relay WTR will be released, but no other circuit action will take place.

When section GR1T is cleared, relay R1TR will be energized and relay R1TP will be released. Relay R1EC will then pick up as previously described, causing the release of relay R1TPP and, after its predetermined time delay period, the release of relay GAEC. The subsequent operations, in which the remainder of the apparatus is again restored to its initial condition, are the same as that described for the previous case.

Next, let it be assumed that a cut of 125 feet in length has entered track section CL1T, causing track relay CL1TR to release and relay CL1TP to pick up. This cut will occupy track section GR1T before section CL1T is cleared. When this occurs, track relays CL1TR through CL4TR and R1TR will be released and repeater relays CL1TP through CL4TP and R1TP will be picked up. Relay R1TPP will also be picked up as previously described.

Section GR2T will be occupied before section CL1T is cleared. When this occurs, track relay R2TR will be released and relay R2TP will be energized.

When the cut clears section CL1T, relay CL1TR will be energized and relay CL1TP will be released. Relay CLEC will now be picked up as previously described. All of the circuits for relays CLA, CLB and CLC will be interrupted at the open back point of contact $b$ of relay R1TPP. Accordingly, these relays, and registration relays 1CL1 through 6CL1 and 1CL2 through 6CL2 will remain deenergized, while relay RTA will remain energized.

When section CL2T is cleared, relay CL2TR is energized and relay CL2TP will be released. However, relay CLEC will remain up over its stick circuit including front contact $a$ of relay CL3TR.

Track section CL3T will be vacated before the cut occupies detector track section WT. When this occurs, track relay CL3TR will be energized and relay CL3TP will be released. Relay CLEC will now be released as previously described.

Switch detector track section WT will be occupied before track section CL4T is vacated. When this occurs, track relay WTR will be released, but no further circuit action will take place.

When section CL4T is vacated, relay R1TR will be energized and relay R1TP will be released. Subsequently, relay GAEC will be picked up as previously described. The remaining operation of the circuit, which will restore the apparatus to its initial condition when sections GR1T, GR2T and WT are sequentially vacated, is the same as that previously described.

Next, let it be assumed that two cuts, somewhat more than 87 feet apart, and, for example, 90 feet apart, are to sequentially traverse the illustrated route segment. Let it be assumed that the first cut is 50 feet in length and the second cut is 75 feet in length.

As the first cut occupies section CL1T, the previously described operation takes place with relay CL1TP being picked up. This cut will occupy sections CL2T, CL3T and CL4T and will vacate sections CL1T and CL2T before the following cut enters section CL1T. As a result, as previously described, the following sequence of operations will have taken place. First, when section CL1T is cleared, relay CLEC will be picked up over back contact $a$ of relay CL1TP and front contacts $a$ of relays CL2TP and CL3TP in multiple, and will stick up over front contacts $a$ of relays CL2TP and CL3TP. Relay CLA will now be picked up over back contact $b$ of relay R1TPP, back contact $a$ of relay SC, front contact $b$ of relay CLEC, front contact $d$ of relay CL3TP, and back contact $d$ of relay CL4TP. Section CL4T is then occupied, and relay CLC will be picked up over back contact $b$ of relay R1TPP, back contact $a$ of relay SC, front contact $c$ of relay CLEC, front contact $b$ of relay CL4TP, and front contact $d$ of relay CL2TP. When section CL2T is vacated, relay CLB will be picked up over back contact b of relay R1TPP, back contact a of relay SC, front contact c of relay CLEC, front contact b of relay CL3TP, and back contact b of relay CL2TP. These relays will now stick up over front contact c of relay CL4TP. With relays CLA, CLB and CLC all up, relays 1CL2 and 4CL2 are picked up as previously described, relay RTA will release, and relays 1CL1 and 4CL1 will remain released as previously described.

The following cut will now occupy track section CL1T, causing track relay CL1TR to release and relay CL1TP to pick up. Relay SC will now pick up over its previously traced circuit extending from terminal B of the battery over front contact a of relay CL4TP, through the winding of relay SC, over front contact d of relay CLEC, front contact b of relay CL1TP, and over front contact c of relay CL3TP to terminal N of the battery. The energization of relay SC interrupts all of the previously traced circuits for relays CLA, CLB and CLC. The leading cut will now enter section GR1T, causing track relay R1TR to release and relays R1TP and R1TPP to pick up.

When track section CL4T is vacted by the lead cut, relay CL4TR will pick up and relay CL4TP will release. Relays CLA, CLB, and CLC will now release, causing relays 1CL2 and 4CL2 to be released and causing relay RTA to be picked up. At this time, relay GAEC will pick up as previously described, and relay SC will release due to the interruption of its pickup circuit at the open front point of contact a of relay CL4TP.

At this time, the following cut will be occupying section CL2T as well as section CL1T. When section CL1T is vacated by the following cut, it will have moved forward so as to occupy each of track sections CL2T, CL3T and CL4T. Accordingly, relay CL1TP will be released and relays CL2TP, CL3TP and CL4TP will be energized. Under these conditions, relay CLEC will be picked up over front contacts a of relays CL2TP and CL3TP in multiple and back contact a of relay CL1TP.

With relay CLEC picked up, relay CLA will be picked up over its alternate pickup circuit including front contact b of relay GAEC, back contact a of relay SC, front contact b of relay CLEC, front contact d of relay CL3TP, and back contact d of relay CL4TP. Relay CLC will be picked up over its alternate pickup circuit including front contact b of relay GAEC, back contact a of relay SC, front contact c of relay CLEC, front contact b of relay CL4TP and front contact d of relay CL2TP.

The leading cut will vacate section GR1T before the following cut vacates sections GR2T. When this occurs, relay R1TR will be picked up and relay R1TP will be released. Relay R1EC will now be picked up as previously described, and relays GAEC and R1TPP will be released. When section CL2T is vacated by the following cut, relay CLB will be picked up over its first previously traced pickup circuit, including back contact b of relay R1TPP, back contact a of relay SC, front contact c of relay CLEC, front contact b of relay CL3TP, and front contact c of relay CL2TP.

With relays CLB and CLC picked up, relays 1CL1 and 4CL1 will be picked up as previously described, relay RTA will be released, and relays 1CL2 and 4CL2 will remain released.

Section GR1T will be occupied by the following cut before the leading cut vacates section GR2T. At this time, relay R1TR will release and relay R1TP will be picked up and pick up relay R1TPP.

When section CL3T is vacated by the following cut, relay CLEC will be released as previously described. When section CL4T is vacated by the following cut, this cut will have occupied section GR2T, and as the remaining sections are subsequently vacated, the circuit operations will proceed as previously described to restore the apparatus to its initial condition. When the leading cut occupies and then vacates detector track section WT, relay R2EC will temporarily be picked up as previously described, and will then be released, to condition it for the same operation in response to the movements of the following cut.

It is believed that the operation of the apparatus comprising this embodiment of my invention under other conditions will be obvious to those skilled in the art from the previous description of the operation under several typical conditions. Accordingly, no attempt will be made to describe the operation of the apparatus under every possible condition.

While I have described only one embodiment of my invention in detail, it will be apparent to those skilled in the art that many changes and modifications may be made within the scope of the invention. Accordingly, I do not wish to be limited to the details of this embodiment shown, but only by the scope of the following claims:

Having described my invention, what I claim is:

1. Railway car cut length detecting apparatus of the class described comprising, in combination, a stretch of railway track divided into four track sections, means for detecting when each of said sections is occupied by cars and each of said detecting means actuated to a first condition or a second condition according as said track sections are occupied or unoccupied, a first relay, means for actuating said first relay from a first condition to a second condition when the first of said track sections is occupied and then vacated by a cut, a second relay, means for actuating said second relay from a first condition to a second condition when said first relay is in its second condition, the third of said detecting means is in its first condition, and the fourth of said detecting means is in its second condition, a third relay, means for actuating said third relay from a first condition to a second condition when the detecting means associated with said second section is in its second condition, the detecting means associated with said third section is in its first condition, and said first relay means is in its second condition, a fourth relay, means for actuating said fourth relay from a first condition to a second condition when the second and fourth of said detecting means are in their first conditions and said first relay is in its second condition, and indication means controlled by said second, third and fourth relays.

2. A railway car cut length detector for a classification yard having a group retarder approached over a stretch of track, said stretch of railway track comprising four adjacent track sections, said group retarder being located on a stretch of track including a track section following said four sections, said apparatus comprising, in combination means for detecting the occupancy of car wheels on each of said track sections and each detecting means being actuated to a first or a second condition according as said track sections are occupied or unoccupied, a first control relay, means for energizing said first control relay when the detecting means for said first track section is in its second condition and at least one of the detecting means for said second and third sections is in its first condition, means for maintaining said first control relay energized when at least one of said detecting means for said second and third track sections is in its first condition, first, second and third registration relays, means for energizing said first registration relay when said detecting means for said first group retarder track section is in its second condition, said first control relay is in its energized condition, said third section detecting means is in its first condition and said fourth section detecting means is in its second condition, means for energizing said second registration relay when said detecting means for said first group retarder track section is in its second condition, said first control relay is in its energized condition, said third section detecting means is in its first condition and said second section detecting means is in its second condition, means for energizing said third registration relay when said detecting means for said first group retarder track section is in its second condition, said first control relay is in its energized condition, said fourth section detecting means is in its first condition and said second section detecting means is in its first condition, and means controlled by the detecting means for said fourth section for maintaining energized ones of said registration relays in their energized conditions until said cut vacates said fourth track section.

3. A railway car cut length detector, comprising, in combination, a stretch of railway track divided into a plurality of track sections, detector means for each of said track sections, each detector means being actuated to a first or a second condition according as said track sections are occupied or unoccupied by car wheels, registration means controlled by the sequence in which said detector means in the various sections are actuated to a first or a second position as the length of a cut traverses said sections, said registration means indicating the length of a cut in terms of the lengths of said track sections, and means controlled by said detector means for preventing the operation of said registration means by a second cut while a first cut is still occupying said sections.

4. A railway car cut length detector, comprising, in combination, a stretch of railway track divided into five adjacent track sections, first, second, third, fourth and fifth means for detecting the occupancy of said track sections by the wheels of the cars, the length of said first and fourth track sections being greater than the length of the second and third track sections, a first control relay, means controlled by said first and said second or third detecting means for energizing said first control relay when said first section is unoccupied and said second or third section is occupied, a second control relay, means controlled by said fifth detecting means for energizing said second control relay when said fifth section is occupied, first, second and third registration relays, means for energizing said first registration relay when said second control relay is in its deenergized condition, said first control relay is in its energized condition, said third track section is occupied and said fourth track section is unoccupied, means for energizing said second registration relay when said first control relay is in its deenergized condition, said first control relay is in its energized condition, said second track section is unoccupied and said third track section is occupied, and means for energizing said third relay when said first control relay is in its energized condition and said second control relay is in its deenergized condition, said second track section is occupied and said fourth track section is occupied, whereby the energized or deenergized conditions of said registration relays in combination indicate the length of a cut traversing said sections.

5. Railway car cut length detecting apparatus of the class described, comprising, in combination, a stretch of railway track having five sequential track sections, means for detecting the occupancy of each of said track sections and each detecting means being actuated to a first condition or a second condition according as its associated track section is occupied or unoccupied by the wheels of the cars, first, second and third registration relays, means controlled by said detecting means for energizing said first registration relay when said third track section has been occupied after said first section has been vacated and before said fourth section has been occupied, means controlled by said detecting means for energizing said second registration relay when said third track section has been occupied after said first and said second sections have been vacated and before said fifth section has been occupied, and means controlled by said detecting means for energizing said third registration relay when said second and fourth track sections have been occupied after said first track section has been vacated and before said fifth track section has been occupied.

6. Railway car cut length detecting apparatus of the class described, comprising, in combination, a stretch of railway track having five sequential track sections, the first and fourth of said sections being twice the length of said second and third sections, means for detecting the occupancy of each of said track sections and each detecting means being actuated to a first condition or a second condition according as the associated track section is occupied or unoccupied by the wheels of the cars, first, second and third registration relays, means controlled by said detecting means for energizing said first registration relay when said third track section has been occupied after said first section has been vacated and before said fourth section has been occupied, means controlled by said detecting means for energizing said second registration relay when said third track section has been occupied after said first and said second sections have been vacated and before said fifth section has been occupied, means controlled by said detecting means for energizing said third registration relay when said second and fourth track sections have been occupied after said first track section has been vacated and before said fifth track section has been occupied, and a utilization device controlled by said registration relays.

7. Railway car cut length detecting apparatus of the class described, comprising, in combination, five sequential track sections, means for detecting the occupancy of each of said track sections and each detecting means being actuating to a first condition or a second condition according as the associated track section is occupied or unoccupied by the wheels of the cars, first, second and third registration relays, means controlled by said detecting means for energizing said first registration relay when said third track section has been occupied after said first section has been vacated and before said fourth section has been occupied, means controlled by said detecting means for energizing said second registration relay when said third track section has been occupied after said first and said second sections have been vacated and before said fifth section has been occupied, means actuated by said detecting means for energizing said third registration relay when said second and fourth track sections have been occupied after said first track section has been vacated and before said fifth track section has been occupied, a plurality of computer control relays, and means for energizing said computer control relays in one of four combinations according as said registration relays are in one of four preselected combinations.

8. Railway car cut length detecting apparatus of the class described, comprising, in combination, five sequential track sections, detector means associated with each of said track sections and each detector means being actuated to a first condition or a second condition according as the associated track section is occupied or unoccupied by cars, first, second and third registration relays, means controlled by said detector means for actuating said first registration relay from a first to a second condition when said third track section has been occupied after said first section has been vacated and before said fourth section has been occupied, means controlled by said detector means for actuating said second registration relay from a first condition to a second condition when said third track section has been occupied after said first and said second sections have been vacated and before said fifth section has been occupied, means actuated by said detector means for actuating said third registration relay from a first to a second condition when said second and fourth track sections have been occupied after said first track section has been vacated and before said fifth track section has been occupied, a plurality of computer control relays actuated in one of four combinations according as registration relays are in one of four preselected combinations, and indication means actuated to a first or a second condition according as said registration relays are in or are not in one of said four predetermined configurations.

9. In combination with a computer for calculating an output value in accordance with one of a predetermined plurality of values of the length of a cut, said computer including means for supplying an additional value when the length of said cut does not fall in a predetermined range, a railway car cut length detector, comprising, in combination, a stretch of railway track divided into a plurality of track sections of predetermined length, means for registering the sequence of occupancy and the sequence of vacancy of car wheels on said sections as a cut of cars passes over said track sections, means controlled by said registration means when said cut is within one of said predetermined length ranges for actuating said computer means, and means controlled by said registration means when the length of said cut is not within said predetermined range for controlling said computer to supply said additional value.

10. Means for registering the length of a cut of railway cars in one of five predetermined categories, comprising, in combination, five adjacent track sections on a stretch of track adapted to be traversed by cuts of cars entering a first of said sections and sequentially occupying said sections, the first and fourth of said sections being 2X feet in length and the second and third of said sections being X feet in length, means for detecting the occupancy of each of said track sections and each detecting means being actuated from a first condition to a second condition by the occupancy of the associated section by a railway car, first control means, means controlled by said detector means for actuating said first control means from a first condition to a second condition when said first track section has been occupied and then vacated by a cut, first registration means, means actuated by said first control means and said third detector means in their second conditions and by said fourth and fifth detector means in their first conditions for actuating said first registration means from a first condition to a second condition, whereby the existence of said first registration means in its second condition indicates that the length of the cut is between 0 and 2X feet, second registration means, means controlled by said first control means and said third detector means in their second conditions and said second detector means and said fifth detector means in their first conditions for actuating said second registration means from a first condition to a second condition, whereby the existence of said second registration means in its second condition indicates that the length of the cut is between 0 and 3X feet in length, and third registration means, and means controlled by said first control means and said second and fourth detector means in their second conditions and by said fifth detector means in its first condition for actuating said third registration means from a first condition to a second condition, whereby the existence of said third registration means in its second condition indicates that the length of the cut is between X and 4X feet in length, the combined conditions of said registration means indicating that the length of the cut is between 0 and X feet, 0 and 2X feet, 0 and 3X feet, or 0 and 4X feet in length according as first and second registration means are in their second conditions and said third registration means is in its first condition, all of said registration means are in their second condition, said first registration means is in its first condition and said second and third registration means are in their second conditions, or said first and second registration means are in their first conditions and said third registration means is in its second condition, respectively.

11. Means for registering the length of a cut of railway cars in one of five predetermined categories, comprising, in combination, five adjacent track sections on a stretch of track adapted to be traversed by cuts of cars entering a first of said sections and sequentially occupying said sections, the first and fourth of said sections being 2X feet in length and the second and third of said sections being X feet in length, means for detecing the occupancy of each of said track sections and each detecting means being actuated from a first condition to a second condition by the occupancy of the associated sections by a railway car, first control means, means controlled by said detector means, for actuating said first control means from a first condition to a second condition when said first track section has been occupied and then vacated by a cut, first registration means, means controlled by said first control means and said third detector means in their second conditions and by said fourth and fifth detector means in their first conditions for actuating said first registration means from a first condition to a second condition, whereby the existence of said first registration means in its second condition indicates that the length of the cut is between 0 and 2X feet, second registration means, means controlled by said first control means and said third detector means in their second conditions and said second detector means and said fifth detector means in their first conditions for actuating said second registration means from a first condition to a second condition, whereby the existence of said second registration means in its second condition indicates that the length of the cut is between 0 and 3X feet in length, third registration means, means controlled by said first control means and said second and fourth detector means in their second conditions and by said fifth detector means in its first condition for actuating said third registration means from a first condition to a second condition, whereby the existence of said third registration means in its second condition indicates that the length of the cut is between X and 4X feet in length, the combined conditions of said registration means indicating that the length of the cut is between 0 and X feet, 0 and 2X feet, 0 and 3X feet, or 0 and 4X feet in length according as first and second registration means are in their second conditions and said third registration means is in its first condition, all of said registration means are in their second conditions, said first registration means is in its first condition and said second and third registration means are in their second conditions, or said first and second registration means are in their first condition and said third registration means is in its second condition, respectively, second control means, and means controlled by said registration means for actuating said second control means in any combination of conditions not previously recited.

12. Means for registering the length of a cut of one or more cars traversing a stretch of track, comprising, in combination, a plurality of adjacent track sections of a predetermined length located on said stretch, means controlled by the sequence of occupancy and the sequence of vacancy of said track sections by a cut for indicating a first condition on said length, additional means controlled by the sequence of occupancy and the sequence of vacancy of said track sections by a cut for indicating additional conditions on said length, the combined indications being sufficient to restrict the length to one of a series of predetermined length categories if said length lies within the range of said categories, and means controlled by said indicating means for actuating a computer in accordance with said indicated length categories.

13. Means for registering the length of a cut of one or more cars traversing a stretch of track, comprising, in combination, a plurality of adjacent track sections of a predetermined length located on said track, means controlled by the sequence of occupancy and the sequence of vacancy of said track sections by a cut for indicating a first condition on said length, additional means controlled by the sequence of occupancy and the sequence of vacancy of said track sections by a cut for indicating additional conditions on said length, the combined indications being sufficient to restrict the length to one of a series of predetermined length categories if said length lies within the range of said categories, and means actuated by said indication means when none of said predetermined conditions of occupancy and vacancy prevail, said last mentioned means indicating when actuated that the length of said cut is beyond said predetermined range.

14. Railway car cut length detecting apparatus of the class described, comprising, in combination, a stretch of track divided into a series of adjacent track sections having a predetermined length relationship one to another, detector means for each of said track sections, each of said detecting means being actuated by the occupancy of said track sections by a cut from a first to a second condition, means for responding to the successive occupancy and vacancy of the first of said sections by a cut and actuated thereby from a first to a second condition, second means actuated from a first to a second condition by the occupancy of the portion of said stretch past the exit end of the last of said track sections, and means controlled by said detector means and said first and second means in response to the sequence of occupancy and vacancy of said sections for indicating the length of said cut in terms of a set of ranges covering lengths determined by the length of the shortest of said track sections.

15. In a railway car cut length detector, a stretch of railway track divided into a plurality of track sections, a track occupancy detector for each track section for indicating when one or more cars are occupying the section, and means for registering the sequence of occupancy of said track sections and for registering the sequence of vacancy of said track sections whereby the length of a cut of one or more cars traversing said section is determined.

16. In a railway car cut length detector, a stretch of railway track divided into a plurality of track sections, detecting means associated with each track section for indicating when the wheels of cars are on the track section, and means for registering the sequence in which the wheels of cars in a cut enter the track sections and the different sequences in which car wheels of different lengths of cuts vacate the track sections whereby the length of a cut traversing said track sections is determined.

17. In a railway car cut length detector, in combination, a stretch of railway track divided into a plurality of track sections, means for detecting the occupancy of each track section by passing cars, means for registering the length of the cuts, and means controlled by said occupancy means for selectively actuating said registering means in accordance with the different sequences of occupancy and vacancy of said track sections.

References Cited in the file of this patent

UNITED STATES PATENTS

| | | |
|---|---|---|
| 1,827,786 | Gilson | Oct. 20, 1931 |
| 1,827,829 | Thompson | Oct. 20, 1931 |
| 1,839,794 | Livingston | Jan. 5, 1932 |